No. 880,582. PATENTED MAR. 3, 1908.
H. O. SECREST.
POT LIFTER.
APPLICATION FILED FEB. 2, 1907.

Witnesses,
Jno. F. Oberlin
G. W. Baywell

Inventor,
Harry O. Secrest,
by J. B. Fay
his attorney.

THE NORRIS PETERS CO., WASHINGTON, D. C.

UNITED STATES PATENT OFFICE.

HARRY O. SECREST, OF CLEVELAND, OHIO.

POT-LIFTER.

No. 880,582.      Specification of Letters Patent.      Patented March 3, 1908.

Application filed February 2, 1907. Serial No. 355,359.

*To all whom it may concern:*

Be it known that I, HARRY O. SECREST, a citizen of the United States, resident of Cleveland, county of Cuyahoga, and State of Ohio, have invented a new and useful Improvement in Pot-Lifters, of which the following is a specification, the principle of the invention being herein explained and the best mode in which I have contemplated applying that principle, so as to distinguish it from other inventions.

My invention relates to pot-lifters and especially to that class of such devices in which provision is made for holding the cover firmly upon the pot when the latter is lifted or otherwise handled.

My invention also relates to such devices in which provision is made for protecting the hands or arms from hot steam, water or other dangerous fluids which might accidentally escape from the pot.

Said invention consists of the means hereinafter fully described and specifically set forth in the claims.

The annexed drawing and the following description set forth in detail certain mechanism embodying the invention, such disclosed means, however, constituting but one of various mechanical forms in which the principle of the invention may be used.

Figure 1:
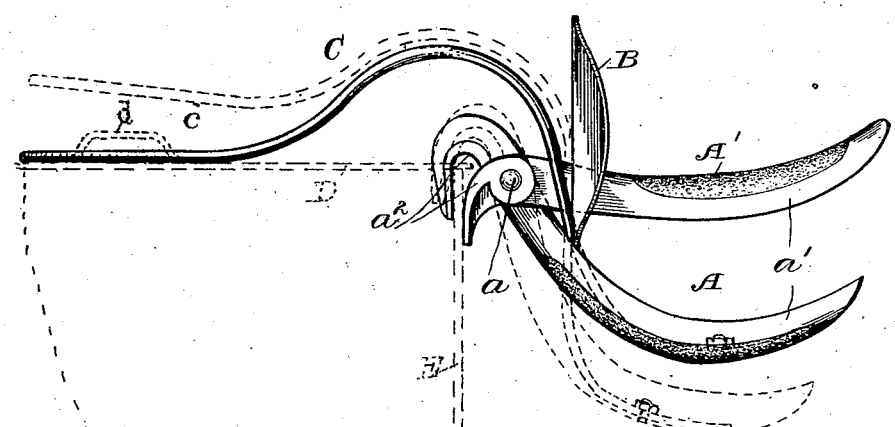
Figure 2:
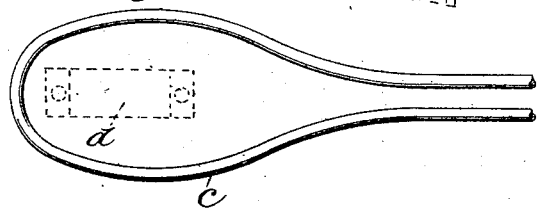

In said annexed drawing Figure 1 represents a central vertical section of a device embodying my invention, the operative position of the same being shown in full lines, and its open position in dotted lines, a conventional illustration of a portion of a pot and a cover therefor being also shown in dotted lines; and Fig. 2 represents a plan view of a portion of the device.

The embodiment of my invention shown in the drawing comprises a pot-lifting-member in the form of pincers comprising a pair of arms or handles A A'; a hand-guard B, and a cover-retaining member C. The two arms A A' are pivoted to each other near one end by means of a pin $a$ and each comprises a handle-portion $a'$ upon one side of said pivotal connection and a bent end-portion or jaw $a^2$ upon the other side, which two end-portions $a^2$ are adapted to coöperate to grasp and firmly hold the edge of the pot when the handle-portions $a'$ are compressed, all as can be plainly seen in the drawing. Suitably secured to the lower pot-lifting arm A is the cover-retaining member C which is preferably made of spring material of circular cross-section and is provided at its outer extremity with an annular portion $c$, Fig. 2, adapted to contact with the pot-cover D around the handle $d$ of the same and hold the cover against the edge of the pot E when the handle-portions $a'$ are in their closed position, as is shown in full lines in the figure. The manner of using the part of my invention thus far described is hence quite obvious, consisting merely in grasping the hot pot by one edge between the members $a^2$, this action effecting the movement of the member $c$ to its operative position. The pot can then be carried wherever desired or handled in any manner to drain or otherwise deal with its contents. This will be found especially serviceable to the house-wife in the draining of boiled potatoes and other vegetables. When the pressure is released from the handles $a'$, the tension of the spring-member C will throw said handles into their open position, consequently effecting the release of the pot E from the jaws $a^2$.

The hand-guard B is secured to the pot-lifting member, and comprises a curved metallic member projecting above the top plane of the pot, thus providing an efficient protection to the fingers and hand from being burned or even dampened by reason of steam, water, etc., accidentally escaping. In addition to this protection provided by the guard B it should be noted that the handles $a'$ are disposed on a level with or below the top plane of the pot so that the hand is thus quite well protected from escaping steam.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention:—

1. In a device of the character described, the combination with pincers comprising a pair of pivotally connected handles adapted to grip the edge of a pot or the like, of a member borne by one of said handles and adapted upon actuation of the latter to retain the cover of such pot in place.

2. In a device of the character described, the combination with pincers comprising a pair of pivotally connected handles adapted to grip the edge of a pot or the like, of a cover-retaining member mounted upon the lower of said handles and adapted to be depressed upon actuation of the latter.

3. In a device of the character described, the combination with pincers comprising a pair of pivotally connected handles having down-turned jaws adapted to grip the edge of a pot or the like, of a spring member borne by one of said handles and adapted upon actuation of the latter to retain the cover of such pot in place.

4. In a device of the character described, the combination with pincers comprising a pair of pivotally connected handles having down-turned jaws adapted to grip the edge of a pot or the like, of a spring member attached at one end to the lower of said handles and having its outer end recurved, said member being adapted upon actuation of said handles to grip the pot to retain the cover of such pot in place.

5. In a device of the character described, the combination with pincers comprising a pair of pivotally connected handles having down-turned jaws adapted to grip the edge of a pot or the like, of a spring member attached to the lower of said handles and adapted upon actuation of the latter to retain the cover of such pot in place, and a hand-guard borne by one of said handles.

Signed by me, this 29" day of January, 1907.

HARRY O. SECREST.

Attested by—
   JNO. F. OBERLIN,
   G. W. SAYWELL.